US011721464B2

(12) United States Patent
Kamakura et al.

(10) Patent No.: US 11,721,464 B2
(45) Date of Patent: Aug. 8, 2023

(54) SOLENOID, SOLENOID VALVE, AND DAMPER

(71) Applicants: KYB CORPORATION, Tokyo (JP); TAKAKO INDUSTRIES, INC., Kyoto (JP)

(72) Inventors: Ryosuke Kamakura, Tokyo (JP); Naoaki Danshita, Kyoto (JP); Kohei Doi, Kyoto (JP)

(73) Assignees: KYB Corporation, Tokyo (JP); TAKAKO INDUSTRIES, INC., Kyoto (JP)

( * ) Notice: Subject to any disclaimer, the term of this patent is extended or adjusted under 35 U.S.C. 154(b) by 421 days.

(21) Appl. No.: 16/979,456

(22) PCT Filed: Mar. 6, 2019

(86) PCT No.: PCT/JP2019/008814
§ 371 (c)(1),
(2) Date: Sep. 9, 2020

(87) PCT Pub. No.: WO2019/176679
PCT Pub. Date: Sep. 19, 2019

(65) Prior Publication Data
US 2021/0012939 A1 Jan. 14, 2021

(30) Foreign Application Priority Data
Mar. 13, 2018 (JP) .................................. 2018-045349

(51) Int. Cl.
*H01F 7/08* (2006.01)
*F16F 9/19* (2006.01)
(Continued)

(52) U.S. Cl.
CPC ................ *H01F 7/081* (2013.01); *F16F 9/19* (2013.01); *F16F 9/348* (2013.01); *F16F 9/516* (2013.01);
(Continued)

(58) Field of Classification Search
CPC .... B60G 17/0152; B60G 13/08; B60G 17/08; B60G 2202/24; B60G 2202/25;
(Continued)

(56) References Cited

U.S. PATENT DOCUMENTS 4,821,770 A * 4/1989 Parrott ...................... B60T 8/34
  303/119.2
4,943,083 A * 7/1990 Groves ................... F16F 9/463
  280/5.515

(Continued)

FOREIGN PATENT DOCUMENTS

CN   105008758 A    10/2015
DE   102014203395 A1  8/2015
(Continued)

OTHER PUBLICATIONS

Nov. 23, 2021, European Search Report issued for related EP Application No. 19767877.4.
(Continued)

*Primary Examiner* — Robert A. Siconolfi
*Assistant Examiner* — James K Hsiao
(74) *Attorney, Agent, or Firm* — Paratas Law Group, PLLC (57) ABSTRACT

To provide a solenoid, a solenoid valve, and a damper in which when the amount of current supplied to the solenoid is small, the thrust of the solenoid to bias an object in one direction can be made small, and at the same time, even when the solenoid is not energized, the object can be biased in the same direction as that of the thrust. The solenoid (Continued)

includes a coil, a first movable iron core and a second movable iron core that are attracted in a direction away from each other by energizing the coil, a coil spring that biases the first movable iron core toward the second movable iron core, and a leaf spring that restricts the approach of the first movable iron core and the second movable iron core.

5 Claims, 4 Drawing Sheets

(51) Int. Cl.

| | | |
|---|---|---|
| F16F 9/34 | (2006.01) | |
| F16F 9/516 | (2006.01) | |
| F16F 9/348 | (2006.01) | |
| F16K 31/06 | (2006.01) | |
| H01F 7/16 | (2006.01) | |
| H01F 27/24 | (2006.01) | |
| H01F 27/28 | (2006.01) | |
| B60G 13/08 | (2006.01) | |
| B60G 17/015 | (2006.01) | |
| B60G 17/08 | (2006.01) | |
| F16F 9/06 | (2006.01) | |

(52) U.S. Cl.
CPC .......... *F16K 31/0675* (2013.01); *H01F 7/16* (2013.01); *H01F 27/24* (2013.01); *H01F 27/28* (2013.01); *B60G 13/08* (2013.01); *B60G 17/0152* (2013.01); *B60G 17/08* (2013.01); *B60G 2202/24* (2013.01); *B60G 2202/25* (2013.01); *B60G 2202/42* (2013.01); *B60G 2206/41* (2013.01); *B60G 2500/11* (2013.01); *B60G 2600/73* (2013.01); *B60G 2800/162* (2013.01); *F16F 9/064* (2013.01); *F16F 2222/12* (2013.01); *F16F 2228/066* (2013.01); *F16F 2230/18* (2013.01); *F16F 2232/08* (2013.01); *F16F 2234/02* (2013.01); *H01F 2007/086* (2013.01)

(58) Field of Classification Search
CPC .......... B60G 2202/42; B60G 2206/41; B60G 2500/10; B60G 2500/11; B60G 2800/162; B60G 2600/73; F16F 9/19; F16F 9/38; F16F 9/43; F16F 9/50; F16F 9/3242; F16F 2222/12; F16F 2228/066; F16F 2230/18; F16F 2234/02; F16F 2234/3214; F16H 1/28; F16H 2057/02039; F16H 57/02; F16K 31/0675; H01F 7/081; H01F 7/16; H01F 27/24; H01F 27/28; H01F 2007/086
See application file for complete search history.

(56) References Cited

U.S. PATENT DOCUMENTS

| | | | | |
|---|---|---|---|---|
| 4,986,393 | A * | 1/1991 | Preukschat | B60G 17/08 188/266.6 |
| 5,016,908 | A * | 5/1991 | Athanas | B60G 17/018 188/266.5 |
| 5,125,432 | A * | 6/1992 | Fujii | B60T 8/3675 137/884 |
| 5,333,836 | A * | 8/1994 | Fukuyo | B60T 8/3675 303/119.2 |
| 6,371,262 | B1 * | 4/2002 | Katou | F16F 9/465 188/266.5 |
| 6,782,980 | B2 * | 8/2004 | Nakadate | F16F 9/3214 188/313 |
| 6,860,370 | B2 * | 3/2005 | Nakadate | F16F 9/3485 188/282.5 |
| 8,794,400 | B2 * | 8/2014 | Nakadate | F16F 9/464 188/266.6 |
| 9,506,520 | B2 * | 11/2016 | Kim | F16F 9/512 |
| 9,550,545 | B2 * | 1/2017 | Murakami | F16F 9/19 |
| 9,796,236 | B2 * | 10/2017 | Inagaki | F16F 9/465 |
| 9,834,054 | B2 * | 12/2017 | Teraoka | F16F 9/5126 |
| 10,634,207 | B2 * | 4/2020 | Yuno | F16F 9/461 |
| 10,634,209 | B2 * | 4/2020 | Smeljanskij | F16F 9/465 |
| 2007/0267068 | A1 * | 11/2007 | Daigre | F16H 61/4043 137/511 |
| 2009/0200125 | A1 * | 8/2009 | Sonsterod | F16F 9/341 251/325 |
| 2010/0213758 | A1 | 8/2010 | Nanahara | |
| 2013/0152776 | A1 * | 6/2013 | Baumgartner | G05D 7/014 91/165 |
| 2016/0025178 | A1 | 1/2016 | Kamakura et al. | |
| 2016/0025237 | A1 | 1/2016 | Mori et al. | |
| 2016/0236533 | A1 * | 8/2016 | Inagaki | F16F 9/46 |
| 2016/0263960 | A1 * | 9/2016 | Teraoka | F16F 9/19 |
| 2020/0032871 | A1 * | 1/2020 | Yamashita | F16F 9/3221 |

FOREIGN PATENT DOCUMENTS

| | | |
|---|---|---|
| EP | 3054189 A1 | 8/2016 |
| EP | 3067585 A1 | 9/2016 |
| JP | H02-145373 U | 12/1990 |
| JP | 2014-173716 A | 9/2014 |
| WO | WO 2009/031007 A2 | 3/2009 |

OTHER PUBLICATIONS

Nov. 30, 2021, Japanese Office Action issued for related JP application No. 2018-045349.
Jun. 2, 2022, Chinese Office Action issued for related CN Application No. 201980017622.6.
Aug. 13, 2021, Chinese Office Action issued for related CN application No. 201980017622.6.

* cited by examiner

SOLENOID, SOLENOID VALVE, AND DAMPER

CROSS REFERENCE TO PRIOR APPLICATION

This application is a National Stage Patent Application of PCT International Patent Application No. PCT/JP2019/008814 (filed on Mar. 6, 2019) under 35 U.S.C. § 371, which claims priority to Japanese Patent Application No. 2018-045349 (filed on Mar. 13, 2018), which are all hereby incorporated by reference in their entirety.

TECHNICAL FIELD

The present invention relates to a solenoid, a solenoid valve including the solenoid, and a damper that has the solenoid valve including the solenoid.

BACKGROUND ART

Solenoids are used, for example, in solenoid valves. Some solenoid valves are used to vary the damping force of a damper interposed between a vehicle body and a wheel of a vehicle.

Such a damper includes, for example, as disclosed in JP2014-173716A, a main valve body that applies a resistance to a flow of a liquid, the flow occurring during extension and contraction of the damper, a pressure introduction passage that has an orifice partway to reduce a pressure upstream of the main valve body and guide the reduced pressure to a back surface of the main valve body, and a pressure control passage that is connected downstream of the orifice in the pressure introduction passage.

Further, in the damper described above, a solenoid valve is provided partway in the pressure control passage. The solenoid valve includes a valve body that is seated on and separated from a valve seat provided partway in the pressure control passage, a biasing spring that biases the valve body in a direction away from the valve seat, and a solenoid that applies a thrust to the valve body in a direction opposite to that of the biasing force of the biasing spring.

Specifically, the solenoid described above includes a coil, a first fixed iron core and a second fixed iron core that are arranged with a predetermined distance therebetween and are magnetized when the coil is energized, an annular movable iron core that is disposed movably between the first fixed iron core and the second fixed iron core, and a shaft that is fixed to the inner circumference of the movable iron core and abuts against the valve body at its distal end. The solenoid described above is configured such that when the coil is excited, a magnetic path is formed so as to pass through the first fixed iron core, the movable iron core, and the second fixed iron core, and the movable iron core is attracted toward the second fixed iron core to cause the shaft to push the valve body toward the valve seat.

The thrust of the solenoid that biases the valve body so as to be closed is proportional to the amount of current supplied to the solenoid, and thus increases as the amount of supply current increases. As a result, the valve opening pressure of the valve body increases. The back pressure of the main valve body is controlled by the valve opening pressure of the valve body, and the resistance of the main valve body increases as the back pressure increases.

For this reason, when the amount of current supplied to the solenoid is increased to increase the valve opening pressure of the valve body, the resistance of the main valve body increases and the damping force generated by the damper increases accordingly, so that hard damping force characteristics can be achieved. Conversely, when the amount of current supplied to the solenoid is reduced to reduce the valve opening pressure of the valve body, the resistance of the main valve body decreases and the damping force generated by the damper decreases accordingly, so that soft damping force characteristics can be achieved.

SUMMARY OF INVENTION

When the damper described above is used in a vehicle and the riding comfort is desired to be improved when the vehicle normally travels on a good road, it is preferable to achieve soft damping force characteristics. When a solenoid valve including a conventional solenoid is used for the damper, soft damping force characteristics can be achieved when the amount of current supplied to the solenoid is reduced, and thus power consumption can be reduced during normal traveling to save power.

Further, when the portion that controls a valve opening pressure is a pressure control valve portion in a valve body of the solenoid valve described above, the valve body includes an opening/closing valve portion that opens and closes the downstream side of the pressure control valve portion. When the solenoid is de-energized and the pressure control valve portion is opened to the maximum, the opening/closing valve portion closes a pressure control passage. A fail passage is connected between an opening/closing portion of the pressure control valve portion and an opening/closing portion of the opening/closing valve portion in the pressure control passage, and a passive valve is provided in the fail passage.

For this reason, at the time of a failure in which the solenoid is de-energized, the opening/closing valve portion closes the pressure control passage and a liquid passes through the passive valve. Consequently, at the time of a failure, the back pressure of a main valve body is determined by the valve opening pressure of the passive valve. That is, even if the power supply to the solenoid valve is cut off, the main valve body applies a predetermined resistance to a flow of the liquid generated when the damper is extended and contracted, and the damper can thus apply a predetermined damping force, which is fail-safe.

However, since it is necessary to provide a passage for a failure in addition to a passage for pressure control in the configuration described above, the structure of the damper becomes complicated and the cost increases. On the other hand, if the valve body of the solenoid valve is biased by a biasing spring so as to be closed and the solenoid applies a thrust to the valve body so as to open the valve body, it is possible to use a common passage for pressure control and a failure. However, power consumption during normal traveling may increase. This is because it is necessary to increase the amount of current supplied to the solenoid in order to achieve soft damping force characteristics during normal traveling in the configuration described above.

That is, in a solenoid valve or the like used for pressure control, there are some cases where when the amount of current supplied to a solenoid is small, the thrust applied to an object such as a valve body is desired to be reduced, and at the same time, even when the solenoid is not energized, the object is desired to be biased in the same direction as that of the thrust.

The present invention has been made in order to solve such a problem, and an object of the invention is to provide a solenoid, a solenoid valve, and a damper in which when the amount of current supplied to the solenoid is small, the thrust of the solenoid to bias an object in one direction can be made small, and at the same time, even when the solenoid is not energized, the object can be biased in the same direction as that of the thrust.

A solenoid that solves the above problem includes a first movable iron core and a second movable iron core that are attracted in a direction away from each other by energizing a coil, a biasing member that biases the first movable iron core toward the second movable iron core, and a first regulation member that restricts approach of the first movable iron core and the second movable iron core.

DESCRIPTION OF EMBODIMENTS

An embodiment of the present invention will be described below with reference to the drawings. Like reference symbols in the several drawings indicate like parts.

Figure 2:
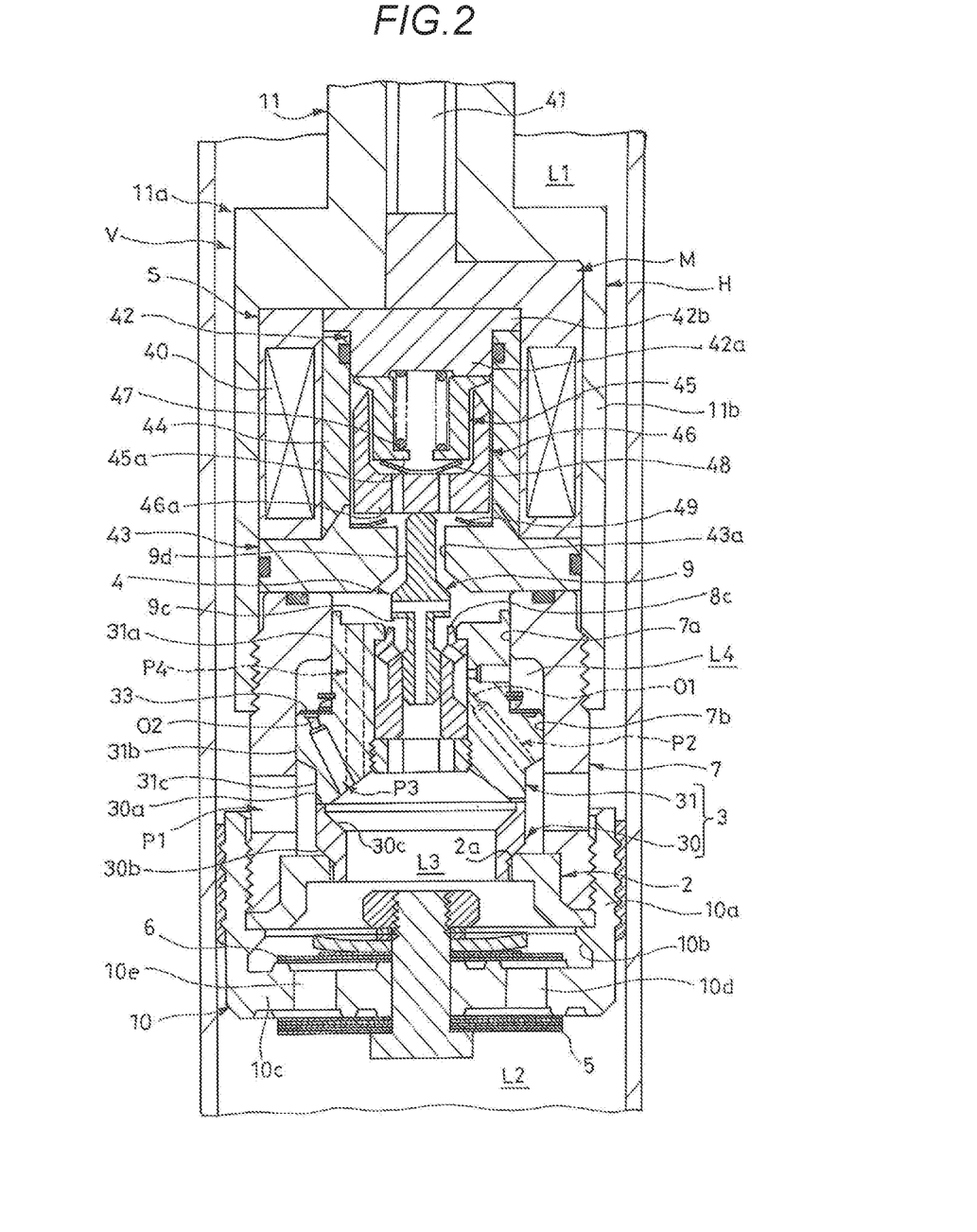
FIG. 2 is an enlarged vertical sectional view of a piston portion of the damper illustrated in FIG. 1.

As illustrated in FIG. 2, a solenoid S according to an embodiment of the present invention is used for a solenoid valve 4, and the solenoid valve 4 is a member that constitutes a damping valve V of a damper D. The damper D is used for vehicle suspensions in the present embodiment.

Figure 1:
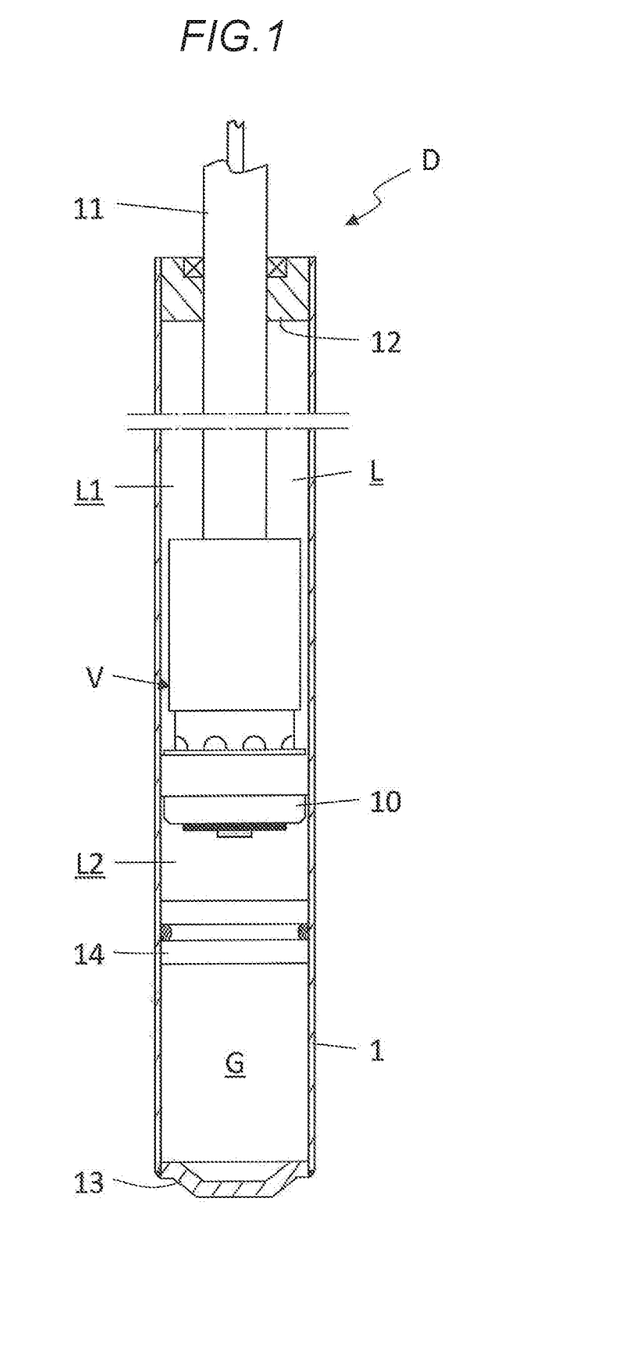
FIG. 1 is a vertical sectional view of a damper that has a solenoid valve including a solenoid according to an embodiment of the present invention.

As illustrated in FIG. 1, the damper D includes a cylinder 1, a piston 10 slidably inserted into the cylinder 1, and a piston rod 11 having one end connected to the piston 10 and the other end projecting outside the cylinder 1.

The cylinder 1 is connected to one of a vehicle body and an axle of a vehicle, and the piston rod 11 is connected to the other one. In this way, the damper D is interposed between the vehicle body and the axle. Further, when the vehicle travels on an irregular road surface and thus vibrates vertically, the piston rod 11 moves into and out of the cylinder 1 to extend and contract the damper D, so that the piston 10 moves within the cylinder 1 vertically (in axial direction) in FIG. 1.

A head member 12 that has an annular shape and allows insertion of the piston rod 11 is attached to one axial end of the cylinder 1. The head member 12 slidably supports the piston rod 11 and closes one end of the cylinder 1. On the other hand, the other end of the cylinder 1 is closed by a bottom cap 13. The cylinder 1 is hermetically sealed as described above, and a liquid and a gas are filled in the cylinder 1.

More specifically, a free piston 14 is slidably inserted into the cylinder 1 so as to be opposite to the piston rod 11 with respect to the piston 10. Then, a liquid chamber L filled with a liquid such as a hydraulic oil is formed on a side of the free piston 14 facing the piston 10. On the other hand, a gas chamber G filled with a compressed gas is formed on a side of the free piston 14 opposite to the piston 10.

The liquid chamber L and the gas chamber G in the cylinder 1 are thus partitioned by the free piston 14 in the damper D. Further, the liquid chamber L is partitioned by the piston 10 into an extension-side chamber L1 closer to the piston rod 11 and a compression-side chamber L2 on the opposite side (opposite side to piston rod). The damping valve V is attached to the piston 10. The damping valve V applies a resistance to a flow of a liquid passing between the extension-side chamber L1 and the compression-side chamber L2.

According to the above configuration, when the damper D is extended, the piston 10 moves upward in FIG. 1 in the cylinder 1 to compress the extension-side chamber L1, and then a liquid in the extension-side chamber L1 moves through the damping valve V to the compression-side chamber L2, and the damping valve V applies a resistance to the flow of the liquid. The pressure of the extension-side chamber L1 thus increases when the damper D is extended, and the damper D applies an extension-side damping force that hinders the extension operation of the damper D.

Conversely, when the damper D is contracted, the piston 10 moves downward in FIG. 1 in the cylinder 1 to compress the compression-side chamber L2, and then a liquid in the compression-side chamber L2 moves through the damping valve V to the extension-side chamber L1, and the damping valve V applies a resistance to the flow of the liquid. The pressure of the compression-side chamber L2 thus increases when the damper D is contracted, and the damper D applies a compression-side damping force that hinders the contraction operation of the damper D.

Further, when the damper D is extended and contracted, the free piston 14 is moved to extend and reduce the gas chamber G, thus compensating for the volume of the piston rod 11 moving into and out of the cylinder 1.

However, the configuration of the damper D is not limited to that illustrated in the drawing, and can be changed as appropriate. For example, instead of the gas chamber G, a reservoir that stores a liquid and a gas may be provided, and the liquid may be passed between the cylinder and the reservoir when the damper is extended and contracted. Further, the damper D may be a double rod type, and piston rods may be provided on both sides of the piston. In this case, a configuration that compensates for the volume of the piston rod can be omitted.

Next, as illustrated in FIG. 2, the damping valve V includes a main passage P1 that causes the extension-side chamber L1 to communicate with the compression-side chamber L2, an annular valve seat member 2 through which the main passage P1 passes on its inner circumferential side, a main valve body 3 that is seated on and separated from the valve seat member 2 to open and close the main passage P1, an extension-side pressure introduction passage P2 that includes an orifice O1 partway to reduce the pressure on a side of the main valve body 3 facing the extension-side chamber L1 and guide the reduced pressure to a back surface of the main valve body 3, a compression-side pressure introduction passage P3 that includes an orifice O2 partway to reduce the pressure on a side of the main valve body 3 facing the compression-side chamber L2 and guide the reduced pressure to the back surface of the main valve body 3, a pressure control passage P4 that is connected downstream of the orifice O1 in the extension-side pressure introduction passage P2 and includes the solenoid valve 4 partway, and an extension-side valve 5 and a compression-side valve 6 that are provided closer to the compression-side chamber L2 than the main valve body 3 in the main passage P1.

Further, the piston 10 and the piston rod 11 constitute a housing H of the damping valve V together with a cylindrical guide 7 connecting these piston 10 and the piston rod 11. More specifically, the piston 10 has a cylindrical shape with a bottom, and a cylindrical portion 10a faces the piston rod 11. In addition, a cylindrical case portion 11a with a top is provided at a distal end of the piston rod 11, and the case portion 11a has a cylindrical portion 11b facing the piston 10. The piston 10 and the case portion 11a are disposed so that the cylindrical portions 10a and 11b face each other.

The one axial end of the guide 7 is screwed into an inner circumference of the distal end of the cylindrical portion 11b in the case portion 11a, and the other axial end of the guide 7 is screwed into an inner circumference of the distal end of the cylindrical portion 10a in the piston 10. In this way, the case portion 11a, the guide 7, and the piston 10 are integrated to function as the housing H of the damping valve V, and the valve seat member 2, the main valve body 3, the solenoid valve 4, and the compression-side valve 6 is housed in the housing H. Further, the extension-side valve 5 is attached to the outside of the housing H.

Figure 3:
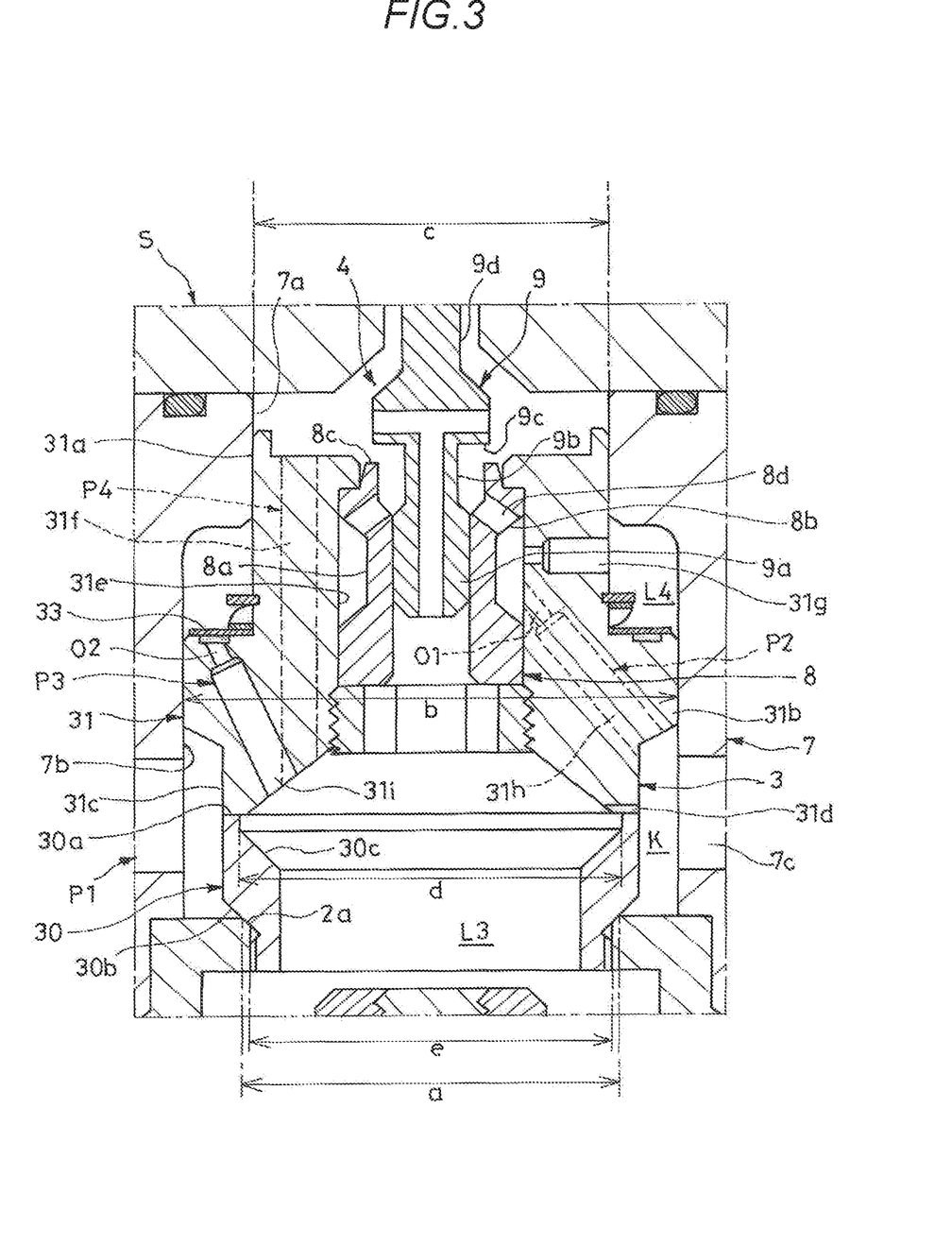
FIG. 3 is an enlarged vertical sectional view of a part of FIG. 2.

Hereinafter, members that are housed in or attached to the housing H of the damping valve V will be described in detail. In the following description, for convenience of description, upper and lower directions in FIGS. 2 and 3 are simply referred to as "upper" and "lower", unless otherwise specified.

A projection 10b is formed on the inner circumference of the cylindrical portion 10a of the piston 10. The outer circumferential portion of the valve seat member 2 is sandwiched between the projection 10b and the guide 7, and thus the valve seat member 2 is fixed therebetween. As described above, the valve seat member 2 is annular, and a first valve seat 2a having an annular shape is formed on an inner circumferential portion of an upper end of the valve seat member 2. The main valve body 3 is seated on and separated from the first valve seat 2a. The main valve body 3 is divided into upper and lower parts, and thus is constituted by a first valve body member 30 on a lower side (closer to valve seat member 2) and a second valve body member 31 stacked on the first valve body member 30.

The first valve body member 30 has an annular shape, and includes, at its upper end, a second valve seat 30a having an annular shape. The second valve body member 31 is seated on and separated from the second valve seat 30a. Moreover, tapered surfaces 30b and 30c are formed on the outer circumference and the inner circumference of the first valve body member 30, respectively. Each of the tapered surfaces 30b and 30c has a truncated cone shape whose diameter gradually decreases toward the lower end. A portion of the first valve body member 30 having the tapered surface 30b formed on its outer circumference is inserted into the inside of the valve seat member 2, so that the tapered surface 30b is seated on and separated from the first valve seat 2a.

On the other hand, the second valve body member 31 includes a head portion 31a, a body portion 31b that is connected to the lower side of the head portion 31a and has an outer diameter larger than the outer diameter of the head portion 31a, and an annular leg portion 31c that is connected to the lower side of the body portion 31b and has an outer diameter smaller than the outer diameter of the body portion 31b. The second valve body member 31 is slidably inserted into the inside of the guide 7, so that the leg portion 31c is seated on and separated from the second valve seat 30a of the first valve body member 30.

More specifically, the inner diameter of an upper end of the guide 7 is smaller than the inner diameter of a lower portion thereof. In the guide 7, a portion having a small inner diameter at the upper end is referred to as "small inner diameter portion 7a", and a portion having a large inner diameter on the lower side is referred to as "large inner diameter portion 7b". The head portion 31a of the second valve body member 31 slide-contacts an inner circumference of the small inner diameter portion 7a, and the body portion 31b of the second valve body member 31 slide-contacts an inner circumference of the large inner diameter portion 7b.

As illustrated in FIG. 3, on the outer circumference of the leg portion 31c of the second valve body member 31 and the first valve body member 30, an annular gap K is formed under the body portion 31b extending radially outward from the leg portion 31c. The annular gap K communicates with the extension-side chamber L1 through a communication hole 7c formed in the guide 7, and the pressure in the annular gap K is thus substantially equal to the pressure in the extension-side chamber L1. The pressure of the extension-side chamber L1 acts on the tapered surface 30b on the outer circumferential side of the main valve body 3, a lower surface of the body portion 31b extending from the leg portion 31c, and the like, and thus the first valve body member 30 and the second valve body member 31 are biased upward by the pressure of the extension-side chamber L1.

More specifically, the outer diameter of a contact portion of the tapered surface 30b of the first valve body member 30 and the first valve seat 2a is referred to as "diameter a", and the outer diameter of a slide contact portion of the body portion 31b of the second valve body member 31 and the large inner diameter portion 7b is referred to as "diameter b". The diameter b is larger than the diameter a (b>a), and the pressure receiving area of the main valve body 3 that receives the pressure of the extension side chamber L1 is the area obtained by removing the area of a circle with the diameter a from the area of a circle with the diameter b. The main valve body 3 is then biased in a direction (opening direction) to separate the first valve body member 30 from the first valve seat 2a by a force obtained by multiplying the pressure of the extension-side chamber L1 by the pressure receiving area.

Consequently, when the pressure of the extension-side chamber L1 increases at the time of the extension of the damper D, the first valve body member 30 and the second valve body member 31 are pushed up by the pressure, and the first valve body member 30 is opened, a liquid in the extension-side chamber L1 passes between the first valve body member 30 and the first valve seat 2a toward a bottom portion 10c (FIG. 2) of the piston 10. The first valve body member 30 then applies a resistance to the flow of the liquid.

As illustrated in FIG. 2, the bottom portion 10c of the piston 10 includes an extension-side passage 10d and a compression-side passage 10e that vertically penetrate the bottom portion 10c. That is, when the area between the body portion 31b of the second valve body member 31 and the bottom portion 10c of the piston 10, the area being surrounded by the leg portion 31c, the first valve body member 30, the valve seat member 2, and the cylindrical portion 10a of the piston 10, is referred to as "central chamber L3", the extension-side passage 10d and the compression-side passage 10e allow the central chamber L3 to communicate with the compression-side chamber L2.

An inlet of the extension-side passage 10d always communicates with the central chamber L3, whereas an outlet of the extension-side passage 10d is opened and closed by the extension-side valve 5 stacked under the bottom portion 10c. This extension-side valve 5 is opened when the damper D is extended to apply a resistance to a flow of a liquid from the central chamber L3 to the compression-side chamber L2 in the extension-side passage 10d, and is closed when the damper D is contracted to block a flow in the opposite direction.

On the other hand, an inlet of the compression-side passage 10e always communicates with the compression-side chamber L2, whereas an outlet of the compression-side passage 10e is opened and closed by the compression-side valve 6 stacked on the bottom portion 10c. This compression-side valve 6 is opened when the damper D is contracted to apply a resistance to a flow of a liquid from the compression-side chamber L2 to the central chamber L3 in the compression-side passage 10e, and is closed when the damper D is extended to block a flow in the opposite direction. The liquid having flown from the compression-side chamber L2 into the central chamber L3 when the damper D is contracted then flows toward the main valve body 3.

The pressure of the central chamber L3 acts on a lower surface of the leg portion 31c of the second valve body member 31 and the like, and the second valve body member 31 is biased upward by the pressure of the central chamber L3. Further, the pressure of the central chamber L3 also acts on the tapered surface 30c on the inner circumferential side of the first valve body member 30 and the like, and the first valve body member 30 is biased downward by the pressure of the central chamber L3. As described above, the first valve body member 30 and the second valve body member 31 are biased in opposite directions by the pressure of the central chamber L3.

More specifically, as illustrated in FIG. 3, an upper side of the head portion 31a of the second valve body member 31 and the central chamber L3 are communicated with each other by a vertical hole 31f to be described later, and the pressures thereof are equal. The outer diameter of a slide contact portion of the head portion 31a of the second valve body member 31 and the small inner diameter portion 7a is referred to as "diameter c", and the inner diameter of a contact portion of the leg portion 31c of the second valve body member 31 and the second valve seat 30a is referred to as "diameter d". The diameter d is larger than the diameter c (d>c), and the pressure receiving area of the second valve body member 31 that receives the pressure of the central chamber L3 is the area obtained by removing the area of a circle with the diameter c from the area of a circle with the diameter d. The second valve body member 31 is then biased in a direction (opening direction) to separate from the second valve seat 30a by a force obtained by multiplying the pressure of the central chamber L3 by the pressure receiving area.

When the inner diameter of a contact portion of the tapered surface 30b on the outer circumferential side of the first valve body member 30 and the first valve seat 2a is referred to as "diameter e", the diameter d is larger than the diameter e (d>e), and the pressure receiving area of the first valve body member 30 that receives the pressure of the central chamber L3 is the area obtained by removing the area of a circle with the diameter e from the area of the circle with the diameter d. The first valve body member 30 is then biased in a direction (closing direction) to be seated on the first valve seat 2a by a force obtained by multiplying the pressure of the central chamber L3 by the pressure receiving area.

Consequently, when the compression-side valve 6 (FIG. 2) is opened at the time of the contraction of the damper D, a liquid flows from the compression-side chamber L2 into the central chamber L3 and the pressure in the central chamber L3 increases accordingly, and the second valve body member 31 is pushed up by this pressure to be separated from the first valve body member 30, the liquid in the central chamber L3 then passes between the second valve body member 31 and the second valve seat 30a toward the extension-side chamber L1. The second valve body member 31 then applies a resistance to the flow of the liquid.

As can be seen from the above, the communication hole 7c, the annular gap K, the central chamber L3, and the extension-side passage 10d and the compression-side passage 10e are a part of the main passage P1 that causes the extension-side chamber L1 to communicate with the compression-side chamber L2. The main passage P1 is opened and closed by the main valve body 3. Furthermore, a portion of the main passage P1 closer to the compression-side chamber L2 than an opening/closing portion of the main valve body 3 branches into the extension-side passage 10d and the compression-side passage 10e, and the extension-side valve 5 and the compression-side valve 6 are disposed in the extension-side passage 10d and the compression-side passage 10e, respectively (FIG. 2). In other words, the extension-side valve 5 and the compression-side valve 6 are connected in parallel to the side of the main valve body 3 facing the compression-side chamber L2.

When the damper D is extended, the first valve body member 30 and the extension-side valve 5 apply a resistance to the flow of the liquid from the extension-side chamber L1 to the compression-side chamber L2 in the main passage P1, and the damper D applies an extension-side damping force due to the resistance. Conversely, when the damper D is contracted, the second valve body member 31 and the compression-side valve 6 apply a resistance to the flow of the liquid from the compression-side chamber L2 to the extension-side chamber L1 in the main passage P1, and the damper D applies a compression-side damping force due to the resistance.

Further, in the present embodiment, a cut-away portion 31d (FIG. 3) is formed at a lower end of the leg portion 31c of the second valve body member 31. An orifice is formed by the cut-away portion 31d. Consequently, even when the main valve body 3 is closed, that is, even when both the first valve body member 30 and the second valve body member 31 are closed, the extension-side chamber L1 communicates with the central chamber L3 through the orifice.

An annular back pressure chamber L4 is formed between the head portion 31a of the second valve body member 31 and the large inner diameter portion 7b of the guide 7 on the body portion 31b extending radially outward from the head portion 31a. The pressure of the back pressure chamber L4 acts on the upper surface of the body portion 31b that is the back surface of the main valve body 3, and the first valve body member 30 and the second valve body member 31 are biased downward by the pressure of the back pressure chamber L4.

More specifically, as illustrated in FIG. 3, the pressure receiving area of the main valve body 3 that receives the pressure of the back pressure chamber L4 is the area obtained by removing the area of the circle with the diameter c from the area of the circle with the diameter b. The main valve body 3 is then biased in a direction (closing direction) to respectively seat the first valve body member 30 and the second valve body member 31 on the first valve seat 2a and the second valve seat 30a by a force obtained by multiplying the pressure of the back pressure chamber L4 by the pressure receiving area.

Further, the second valve body member 31 includes a mounting hole 31e in a central portion from the head portion 31a to the body portion 31b. The second valve body member 31 also includes the vertical hole 31f that is located on an outer circumferential side of the mounting hole 31e and causes the upper side of the head portion 31a to communicate with an inner circumferential side of the leg portion 31c, a horizontal hole 31g whose one end is open to the back pressure chamber L4 and whose other end is open to the mounting hole 31e, a first inclined hole 31h that causes the mounting hole 31e to communicate with the annular gap K, and a second inclined hole 31i that causes the back pressure chamber L4 to communicate with the central chamber L3.

A cylindrical valve case 8 is attached to the mounting hole 31e, and the valve case 8 is disposed with its axial end facing upward. An annular groove 8a is formed on an outer circumference of the valve case 8 along a circumferential direction, and with the annular groove 8a, an annular gap with the top and bottom closed is formed on the outer circumference of the valve case 8. The horizontal hole 31g and the first inclined hole 31h are open to this gap.

The back pressure chamber L4 thus communicates with the extension-side chamber L1 through the horizontal hole 31g, the gap formed on the outer circumference of the valve case 8 by the annular groove 8a, the first inclined hole 31h, the annular gap K, and the communication hole 7c. Since the orifice O1 is disposed partway in the first inclined hole 31h, the pressure of the extension-side chamber L1 is reduced and the reduced pressure is guided to the back pressure chamber L4.

In the second valve body member 31, a check valve 33 that opens and closes the outlet of the second inclined hole 31i is attached to the upper side of the body portion 31b that extends radially outward from the head portion 31a. This check valve 33 is opened when the damper D is contracted to allow a flow of a liquid from the central chamber L3 to the back pressure chamber L4 in the second inclined hole 31i, and is closed when the damper D is extended to block a flow in the opposite direction. Since the orifice O2 is disposed partway in the second inclined hole 31i, the pressure of the central chamber L3 is reduced and the reduced pressure is guided to the back pressure chamber L4.

The valve case 8 includes, in its upper part, a tapered portion 8b whose inner diameter gradually increases toward the upper end and an annular valve seat portion 8c that projects upward from an upper end of the tapered portion 8b. The tapered portion 8b includes a communication hole 8d that causes the annular gap formed on the outer circumference of the valve case 8 by the annular groove 8a to communicate with an inner circumferential side of the tapered portion 8b. Further, a valve body 9 of the solenoid valve 4 is seated on and separated from the valve seat portion 8c of the valve case 8.

The valve body 9 includes a sliding portion 9a that is slidably inserted into the inside of the valve case 8, a small-diameter portion 9b that projects above the valve case 8 from the sliding portion 9a and has an outer diameter smaller than the outer diameter of the sliding portion 9a, an opening/closing portion 9c that projects horizontally from the upper end of the small-diameter portion 9b extending to the outside of the valve case 8 to be seated on and separated from the valve seat portion 8c, and a shaft portion 9d that projects upward from the opening/closing portion 9c.

The solenoid valve 4 includes the solenoid S that applies a thrust to the valve body 9 in a downward direction, that is, in a direction to seat the opening/closing portion 9c on the valve seat portion 8c, when the solenoid valve 4 is energized. When the valve body 9 receives the thrust of the solenoid S to be moved downward, the opening/closing portion 9c is seated on the valve seat portion 8c. Further, an annular gap is formed between an outer circumference of the small-diameter portion 9b of the valve body 9 and the valve case 8, and the pressure of the back pressure chamber L4 is transmitted to this gap through the communication hole 8d. The valve body 9 is thus biased upward by the pressure of the back pressure chamber L4.

Consequently, when the force due to the pressure of the back pressure chamber L4 that biases the valve body 9 upward exceeds the thrust of the solenoid S that acts in the direction to push down the valve body 9, the opening/closing portion 9c of the valve body 9 is separated from the valve seat portion 8c. Then, when the valve body 9 is opened in this way, a liquid passes between the opening/closing portion 9c and the valve seat portion 8c to be flown into the upper side of the head portion 31a of the second valve body member 31. The liquid then flows from the upper side of the head portion 31a to the central chamber L3 through the vertical hole 31f.

As can be seen from the above, the first inclined hole 31h, the gap formed on the outer circumference of the valve case 8 by the annular groove 8a, and the horizontal hole 31g constitute the extension-side pressure introduction passage P2 that includes orifice O1 to reduce the pressure on the side of the main valve body 3 facing the extension-side chamber L1 and guide the reduced pressure to the back surface of the main valve body 3.

Further, the second inclined hole 31i constitutes the compression-side pressure introduction passage P3 that includes the orifice O2 to reduce the pressure on the side of the main valve body 3 facing the compression-side chamber L2 and guide the reduced pressure to the back surface of the main valve body 3. The compression-side pressure introduction passage P3 is one-way because of the check valve 33, and allows only a flow of a liquid from the side of the compression-side chamber L2 to the back surface of the main valve body 3.

Moreover, the communication hole 8d, the gap formed on the outer circumference of the small-diameter portion 9b of the valve body 9, the upper side of the head portion 31a of the second valve body member 31, and the vertical hole 31f constitute the pressure control passage P4 connected downstream of the orifice O1 in the extension-side pressure introduction passage P2, and the solenoid valve 4 is disposed partway in the pressure control passage P4.

Then, when the damper D is extended, in which the pressure of the extension-side chamber L1 increases, a liquid flows from the extension-side chamber L1 into the back pressure chamber L4 through the extension-side pressure introduction passage P2, and thus the pressure of the back pressure chamber L4 increases. Further, when the valve body 9 of the solenoid valve 4 is opened by the pressure of the back pressure chamber L4, the liquid flows from the back pressure chamber L4 to the central chamber L3 through the pressure control passage P4 to join a flow of a liquid from the extension-side chamber L1 to the compression-side chamber L2 in the main passage P1.

Consequently, when the damper D is extended, the pressure of the back pressure chamber L4 is controlled by the valve opening pressure of the valve body 9 of the solenoid valve 4. As the amount of current supplied to the solenoid valve 4 is adjusted to adjust the thrust of the solenoid S, the valve opening pressure of the valve body 9 is adjusted. In a normal state where the solenoid valve 4 is energized, the pressure of the back pressure chamber L4 at the time of the extension of the damper D can thus be controlled. As described above, in the present embodiment, the solenoid valve 4 functions as a pressure control valve that controls the back pressure of the main valve body 3 when the damper D is extended.

Conversely, when the damper D is contracted in which a liquid flows from the compression-side chamber L2 into the central chamber L3, the check valve 33 is opened, and the liquid flows from the central chamber L3 to the back pressure chamber L4 through the compression-side pressure introduction passage P3. The liquid then flows from the back pressure chamber L4 to the extension-side chamber L1 through the extension-side pressure introduction passage P2.

At this time, the pressure on the downstream side of the solenoid valve 4 in the pressure control passage P4 is equal to the pressure of the central chamber L3 and is higher than the pressure of the back pressure chamber L4 on the upstream side of the solenoid valve 4, and thus the valve body 9 of the solenoid valve 4 is kept closed. As a result, in the present embodiment, when the damper D is contracted, the pressure control of the back pressure chamber L4 by the solenoid valve 4 does not work effectively.

As illustrated in FIG. 2, the solenoid S is housed in the case portion 11a of the piston rod 11. The solenoid S includes a molded stator M in which a coil 40 and a harness 41 for energizing the coil 40 are integrated with a molding resin, a first fixed iron core 42 and a second fixed iron core 43 that are magnetized when the coil 40 is energized, and a filler ring 44 that is interposed between the first fixed iron core 42 and the second fixed iron core 43 to form a magnetic gap between these fixed iron cores.

The molded stator M is housed in the case portion 11a. The first fixed iron core 42 includes a base portion 42a and an annular flange portion 42b extending radially outward from one end of the base portion 42a. The first fixed iron core 42 is inserted into the molded stator M with the flange portion 42b facing upward. On the other hand, the second fixed iron core 43 has a substantially disc shape and is stacked under the molded stator M.

The filler ring 44 has a cylindrical shape and has one end abutting against the flange portion 42b of the first fixed iron core 42 and the other end abutting against the second fixed iron core 43. Consequently, at the time of assembly, the molded stator M is firstly inserted into the case portion 11a of the piston rod 11, the first fixed iron core 42 and the filler ring 44 are then inserted into the inside of the molded stator P in this order, the second fixed iron core 43 is placed under the molded stator M, and the guide 7 is screwed into the case portion 11a. As a result, the second fixed iron core 43 is fixed to a distal end of the cylindrical portion of the molded stator M, and the first fixed iron core 42 is fixed to a ceiling portion inside of the case portion 11a.

In this way, the first fixed iron core 42 and the second fixed iron core 43 are arranged with a predetermined distance therebetween. The solenoid S includes a first upper (closer to first fixed iron core 42) movable iron core 45 and a second lower (closer to second fixed iron core 43) movable iron core 46 that are disposed between the first fixed iron core 42 and the second fixed iron core 43 so as to be movable vertically (toward first fixed iron core 42 and toward second fixed iron core 43), and a coil spring 47 that biases the first movable iron core 45 downward (toward second movable iron core 46).

Both the first movable iron core 45 and the second movable iron core 46 have a cylindrical shape with a bottom, and are disposed with their bottom portions 45a and 46a facing downward. The first movable iron core 45 is inserted into the inside of the second movable iron core 46 so as to be movable in the axial direction. The coil spring 47 is further inserted into the inside of the first movable iron core 45, and the coil spring 47 is interposed between the bottom portion 45a of the first movable iron core 45 and the first fixed iron core 42 in a compressed state to bias the first movable iron core 45 toward the second movable iron core 46.

As described above, the coil spring 47 is used as a biasing member that biases the first movable iron core 45 toward the second movable iron core 46 in the present embodiment. However, the configuration of the biasing member is not limited to this, and can be changed as appropriate. For example, the biasing member may be a spring other than a coil spring or may be an elastic member such as rubber, and the arrangement of the biasing member can be changed according to the configuration of the biasing member.

A communication hole (not illustrated) penetrating in the axial direction is formed in each of the bottom portion 45a of the first movable iron core 45 and the bottom portion 46a of the second movable iron core 46. It is thus possible to prevent a pressure difference between the inside of the first movable iron core 45 and the second movable iron core 46 and the outside of the first movable iron core 45 and the second movable iron core 46 from hindering smooth movements of these iron cores. The position and number of the communication holes are not limited to those illustrated in the figure, and can be changed as appropriate.

The solenoid S also includes a leaf spring 48 disposed between the bottom portion 45a of the first movable iron core 45 and the bottom portion 46a of the second movable iron core 46 and a leaf spring 49 disposed between the bottom portion 46a of the second movable iron core 46 and the second fixed iron core 43. Hereinafter, for convenience of description, the leaf spring 48 closer to the first movable iron core 45 is referred to as "first leaf spring 48", and the leaf spring 49 closer to the second fixed iron core 43 is referred to as "second leaf spring 49".

When the bottom portion 45a of the first movable iron core 45 and the bottom portion 46a of the second movable iron core 46 come close to each other to some extent, the first leaf spring 48 prevents the first movable iron core 45 and the second movable iron core 46 from further approaching, thus avoiding adsorption of the first movable iron core 45 to the second movable iron core 46. Similarly, when the bottom portion 46a of the second movable iron core 46 and the second fixed iron core 43 come close to each other to some extent, the second leaf spring 49 prevents the second movable iron core 46 and the second fixed iron core 43 from further approaching, thus avoiding adsorption of the second movable iron core 46 to the second fixed iron core 43.

As described above, the first and second leaf springs 48 and 49 function as regulation members that restrict the approach amount of the first movable iron core 45 and the second movable iron core 46 or of the second movable iron core 46 and the second fixed iron core 43 to prevent these contacts. However, if the regulation member can prevent the iron cores from approaching each other more than a predetermined distance, the configuration of the regulation member can be changed as appropriate.

For example, one or both of the first leaf spring 48 and the second leaf spring 49 may be replaced with a ring made of rubber, synthetic resin or the like, and the ring may be used as the regulation member. Further, the minimum gap amount between the first movable iron core 45 and the second movable iron core 46 and the minimum gap amount between the second movable iron core 46 and the second fixed iron core 43, which are determined by the regulation member, can be changed as appropriate.

In the solenoid 5, when the coil 40 is excited, a magnetic path is formed so as to pass through the first fixed iron core 42, the first movable iron core 45, the second movable iron core 46, the second fixed iron core 43, and the case portion 11a, and the first movable iron core 45 is attracted to the first fixed iron core 42, whereas the second movable iron core 46 is attracted to the second fixed iron core 43. In other words, when the coil 40 is excited, the first movable iron core 45 and the second movable iron core 46 are attracted in a direction away from each other.

There is no regulation member such as the first leaf spring 48 and the second leaf spring 49 between the first movable iron core 45 and the first fixed iron core 42. For this reason, when the amount of current supplied to the solenoid S is larger than or equal to a predetermined value, the first movable iron core 45 moves upward against the biasing force of the coil spring 47 to be adsorbed to the first fixed iron core 42. In such a state, the biasing force of the coil spring 47 is not transmitted to the second movable iron core 46.

However, in the present embodiment, the biasing force of the coil spring 17 is transmitted via the first movable iron core 45 and the first leaf spring 48 to the second movable iron core 46 until the first movable iron core 45 is adsorbed. In other words, the second movable iron core 46 is biased downward by the biasing force of the coil spring 47 until the first movable iron core 45 is adsorbed.

An insertion hole 43a is formed in a central portion of the second fixed iron core 43 so as to axially penetrate the second fixed iron core 43. A shaft portion 9d of the valve body 9 of the solenoid valve 4 is movably inserted into the insertion hole 43a, and a distal end of the shaft portion 9d abuts against a lower end of the second fixed iron core 43. Consequently, when the second movable iron core 46 is biased downward by the biasing force of the coil spring 47, or when the second movable iron core 46 is attracted downward (to second fixed iron core 43) when the solenoid S is energized, a downward force acts on the valve body 9, that is, a force acts in a direction to push down the valve body 9.

Figure 4:
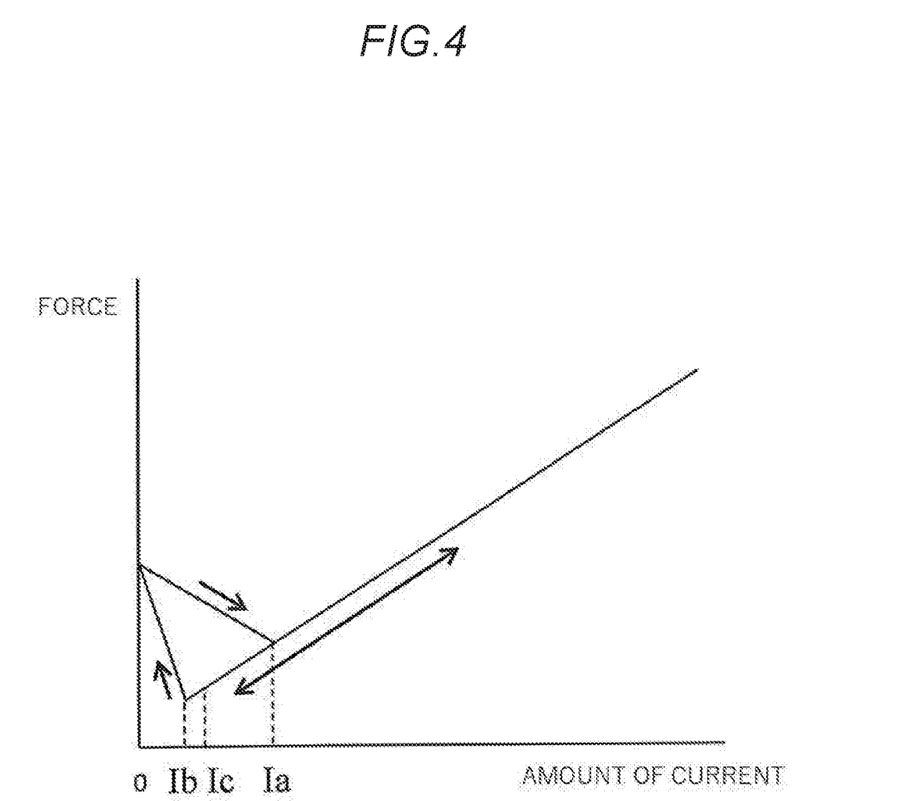
FIG. 4 is a characteristic diagram illustrating a relationship between the amount of supply current and a force acting in a direction of pushing down a valve body in the solenoid according to an embodiment of the present invention.

FIG. 4 illustrates a relationship between the amount of current supplied to the solenoid S and a force applied by the solenoid S in a direction to push down the valve body 9. In FIG. 4, Ia indicates the minimum amount of current required to adsorb the first movable iron core 45, which is separated from the first fixed iron core 42, to the first fixed iron core 42. In addition, Ib indicates the minimum amount of current required to keep the first movable iron core 45 adsorbed to the first fixed iron core 42.

When the solenoid S is not energized, the biasing force of the coil spring 17 acts via the first movable iron core 45 and the second movable iron core 46 to push down the valve body 9. Consequently, as illustrated in FIG. 4, the valve body 9 can be biased downward by the solenoid S even when the solenoid S is not energized.

When the amount of current supplied to the solenoid S is increased from such a state, the force of attracting the first movable iron core 45 upward and the second movable iron core 46 downward increases. In a region where the amount of current supplied to the solenoid S is less than Ia, the biasing force of the coil spring 47 is transmitted to the valve body 9, but a part of the force of the coil spring 47 that biases the first movable iron core 45 downward is offset by the force that attracts the first movable iron core 45. As a result, in the region where the amount of current supplied to the solenoid S is less than Ia, the downward force applied by the solenoid S to the valve body 9 decreases as the amount of current supplied increases.

On the other hand, when the amount of current supplied to the solenoid S larger than or equal to Ia, the first movable iron core 45 is adsorbed to the first fixed iron core 42 and the biasing force of the coil spring 47 is not transmitted to the second movable iron core 46. In such a state, only the force to attract the second movable iron core 46 acts in the direction to push down the valve body 9. Since the force to attract the second movable iron core 46 increases in proportion to the amount of current supplied, in the region where the amount of current supplied to the solenoid S is larger than or equal to Ia, the downward force applied by the solenoid S to the valve body 9 increases as the amount of current supplied increases.

Conversely, as the amount of current supplied to the solenoid S is reduced, the force to attract the first movable iron core 45 upward and the second movable iron core 46 downward is reduced. In a region where the amount of current supplied to the solenoid S is larger than or equal to Ib, the first movable iron core 45 is kept adsorbed to the first fixed iron core 42. As a result, in the region where the amount of current supplied to the solenoid S is larger than or equal to Ib, the downward force applied by the solenoid S to the valve body 9 is reduced as the amount of current supplied decreases.

When the amount of current supplied to the solenoid S is less than Ib, the first movable iron core 45 is separated from the first fixed iron core 42. As a result, in the region where the amount of current supplied to the solenoid S is less than Ib, the downward force applied by the solenoid S to the valve body 9 increases as the amount of current supplied decreases.

In the present embodiment, the minimum amount Ib of current required to keep the adsorption of the first movable iron core 45 is less than the minimum amount Ia of current required for the adsorption (FIG. 4). The characteristics of the force with respect to the amount of current supplied to the solenoid S are thus characteristics with hysteresis. Note that a region where the amount of supply current is small is exaggerated in FIG. 4. Further, in a normal state where the solenoid valve 4 is energized, the amount of supply current is adjusted within the range of Ic or more, and Ic is set to be larger than or equal to Ib in the present embodiment.

In the normal state, once energisation with Ia or more is performed to adsorb the first movable iron core 45 to the first fixed iron core 42, and then the amount of current is set to a current value that is not less than or equal to Ib. Consequently, in the normal state, the thrust of the solenoid S acting in the direction to push down the valve body 9 increases in proportion to the amount of supply current, and the valve opening pressure of the valve body 9 increases as the amount of supply current increases. Further, in a state where the valve body 9 is seated on the valve seat portion 8c, the thrust force of the solenoid S acts in a direction to close the main valve body 3 via the valve body 9 and the valve case 8.

When the amount of current supplied to the solenoid valve 4 is increased in the normal state, the thrust of the solenoid S acting in the direction to close the main valve body 3 increases. At the same time, the valve opening pressure of the valve body 9 increases when the damper D is extended, and the pressure of the back pressure chamber L4 also increases, and the force to bias the main valve body 3 in the closing direction due to the pressure in the back pressure chamber L4 increases accordingly. When the damper D is contracted, the pressure control of the back pressure chamber L4 by the solenoid valve 4 does not work effectively, but if the amount of current supplied to the solenoid valve 4 is increased, the thrust force of the solenoid S acting in the direction to close the main valve body 3 is increased.

Consequently, when the amount of current supplied to the solenoid valve 4 is increased in the normal state, the first valve body member 30 and the second valve body member 31 are difficult to be opened, and the resistance when a liquid passes through these valve body members increases. As a result, when the amount of current supplied to the solenoid valve 4 is increased in the normal state, the damping force on the extension side and the compression side, which is generated by the damper D, increases, and thus hard damping force characteristics can be achieved.

Conversely, when the amount of current supplied to the solenoid valve 4 is reduced in the normal state, the thrust of the solenoid S acting in the direction to close the main valve body 3 decreases. At the same time, the valve opening pressure of the valve body 9 decreases when the damper D is extended, and the pressure of the back pressure chamber L4 also decreases, and the force to bias the main valve body 3 in the closing direction due to the pressure of the back pressure chamber L4 decreases accordingly. When the damper D is contracted, the pressure control of the back pressure chamber L4 by the solenoid valve 4 does not work effectively, but if the amount of current supplied to the solenoid valve 4 is reduced, the thrust force of the solenoid S acting in the direction to close the main valve body 3 is also reduced.

Consequently, when the amount of current supplied to the solenoid valve 4 is reduced in the normal state, the first valve body member 30 and the second valve body member 31 are easy to be opened, and the resistance when a liquid passes through these valve body members decreases. As a result, when the amount of current supplied to the solenoid valve 4 is reduced in the normal state, the damping force on the extension side and the compression side, which is generated by the damper D, decreases, and thus soft damping force characteristics can be achieved.

On the other hand, at the time of a failure in which the solenoid valve 4 is de-energized, the first movable iron core 45 is separated from the first fixed iron core 42 and the coil spring 47 functions, and thus a downward force due to the biasing force of the coil spring 17 acts on the valve body 9.

When the damper D is extended at the time of a failure, the pressure of the back pressure chamber L4 is determined by the valve opening pressure of the valve body 9. The valve opening pressure of the valve body 9 can be freely set by the characteristics of the coil spring 47. In the state where the valve body 9 is seated on the valve seat portion 8c, the downward force due to the biasing force of the coil spring 47 acts in the direction to close the main valve body 3 via the valve body 9 and the valve case 8.

Consequently, if the coil spring 47 that can apply a large biasing force is used, for example, a force to bias the main valve body 3 in the closing direction by the solenoid S itself can be increased, and the valve opening pressure of the valve body 9 can be set high. As a result, the resistance applied by the main valve body 3 to a flow of a liquid passing through the main passage P1 can be increased and the damping force on the extension side and the compression side of the damper D at the time of a failure can be increased.

More specifically, when the state where the amount of current supplied to the solenoid valve 4 in the normal state is set to the minimum amount (Ic) is referred to as "full soft state", the damping force on the extension side and the compression side of the damper D at the time of a failure can be set larger than a damping force in a full soft state. It is thus possible to prevent the damping force at the time of a failure from becoming insufficient.

Further, even if the damping force at the time of a failure is made larger than the damping force in the full soft state, the biasing force of the coil spring 47 can be canceled when the solenoid valve 4 is energized. The damping force does not become excessive in the full soft state. In addition, in the normal state, only a small amount of current supplied to the solenoid valve 4 is required when soft damping force characteristics are achieved, and thus when soft damping force characteristics are achieved during a normal traveling of a vehicle having the damper D mounted thereon, the power consumption can be reduced. Moreover, heat generation of the solenoid S can be reduced and a change in the liquid temperature of the damper D can be made small, so that the change in damping force characteristics due to the change in the liquid temperature can be made small.

Hereinafter, the operations and effects of the solenoid S, the solenoid valve 4 including the solenoid S, and the damper D that has the solenoid valve 4 including the solenoid S according to the present embodiment will be described.

In the present embodiment, the solenoid S includes the coil 40, the first movable iron core 45 and the second movable iron core 46 that are attracted in a direction away from each other by energizing the coil 40, the coil spring (biasing member) 47 that biases the first movable iron core 45 toward the second movable iron core 46, and the first leaf spring (regulation member) 48 that restricts the approach of the first movable iron core 45 and the second movable iron core 46.

According to the above configuration, the biasing force of the coil spring 47 can be canceled by the force to attract the first movable iron core 45 when the solenoid S is energized, and an object such as the valve body 9 can be biased in one direction by the force to attract the second movable iron core 46. Since the force to attract the second movable iron core 46 becomes smaller as the amount of current supplied to the solenoid S becomes smaller, the thrust applied to the valve body 9 can be made small when the amount of current supplied to the solenoid S is small.

Further, according to the above configuration, the attraction of the first movable iron core 45 is released when the solenoid S is not energized, and the biasing force of the coil spring 47 is transmitted via the first movable iron core 45, the first leaf spring 48, and the second movable iron core 46 to the valve body 9. The direction in which the biasing force of the coil spring 47 acts on the valve body 9 is the same as the direction of the force that attracts the second movable iron core 46, and thus the valve body 9 can be biased in the same direction as the direction of the thrust at the time of energization even when the solenoid S is not energized.

That is, according to the above configuration, when the amount of current supplied to the solenoid S is small, the thrust of the solenoid S that biases the valve body (object) 9 in one direction can be made small, and the valve body (object) 9 can be biased in the same direction as the direction of the thrust even when the solenoid S is not energized.

Moreover, the solenoid S according to the present embodiment includes the first fixed iron core 42 and the second fixed iron core 13 that are arranged with a predetermined distance therebetween. The predetermined distance is a distance at which the first movable iron core 45 and the second movable iron core 46 can approach or be separated from each other between the first fixed iron core 42 and the second fixed iron core 43, and can be freely set. The first movable iron core 45 and the second movable iron core 46 are disposed between the first fixed iron core 42 and the second fixed iron core 43 so as to be able to approach or be separated from each other.

Further, the first movable iron core 45 is disposed on a side of the second movable iron core 46 facing the first fixed iron core 42, and is attracted to the first fixed iron core 42 by energizing the coil 40. On the other hand, the second movable iron core 46 is disposed on a side of the first movable iron core 45 facing the second fixed iron core 43, and is attracted to the second fixed iron core 43 by energizing the coil 40. For this reason, it is easy to attract the first movable iron core 45 and the second movable iron core 46 in a direction away from each other by energizing the coil 40.

Furthermore, in the solenoid S according to the present embodiment, both the first movable iron core 45 and the second movable iron core 46 have a cylindrical shape with a bottom, and the respective bottom portions 45a and 46a face the second fixed iron core 43. The first movable iron core 45 is movably inserted into the inside of the second movable iron core 46. The biasing member that biases the first movable iron core 45 toward the second movable iron core 46 is the coil spring 47. The coil spring 47 is inserted into the inside of the first movable iron core 45 and is interposed between the bottom portion 45a of the first movable iron core 45 and the first fixed iron core 42.

According to the above configuration, when the coil 40 is excited, a magnetic path is formed so as to pass through the first fixed iron core 42, the first movable iron core 45, the second movable iron core 46, and the second fixed iron core 43. It is thus easy to attract the first movable iron core 45 to the first fixed iron core 42 and attract the second movable iron core 46 to the second fixed iron core 43. Since the coil spring 47 functioning as the biasing member is housed inside the first movable iron core 45, it is possible to prevent the solenoid S from extending in the axial direction.

However, if the first movable iron core 45 and the second movable iron core 46 are attracted in the direction away from each other by energizing the coil 40, any fixed iron core may be provided, and the configurations of the first movable iron core 45 and the second movable iron core 46 can be changed as appropriate. Further, the configuration of the biasing member is not limited to a coil spring, and can be changed as appropriate.

Moreover, the solenoid S according to the present embodiment includes the leaf spring 48 that is a first regulation member that restricts the approach of the first movable iron core 45 and the second movable iron core 46 and the leaf spring 49 that is a second regulation member that restricts the approach of the second movable iron core 46 and the second fixed iron core 43. It is thus possible to prevent the first movable iron core 45 from being adsorbed to the second movable iron core 46 and the second movable iron core 46 from being adsorbed to the second fixed iron core 43.

However, the configurations of the first and second regulation members are not limited to the leaf springs 48 and 49, and can be changed as appropriate. Such changes can be made regardless of the arrangement of a fixed iron core in order to attract the first movable iron core 45 and the second movable iron core 46 in the direction away from each other, the configurations of the first movable iron core 45 and the second movable iron core 46, and the configuration of the biasing member.

In the solenoid S according to the present embodiment, the first movable iron core 45 is set to be adsorbed to the first fixed iron core 42 by energizing the coil 40. The minimum amount Ia of current required to adsorb the first movable iron core 45 to the first fixed iron core 42 is larger than the minimum amount Ib of current required to keep the first movable iron core 45 adsorbed to the first fixed iron core 42.

The characteristics of the thrust of the solenoid S with respect to the amount of current supplied to the coil 40 have characteristics with hysteresis. Furthermore, in a state where the first movable iron core 45 is adsorbed to the first fixed iron core 42, the biasing force of the coil spring 47 is not transmitted to the second movable iron core 46. When the first movable iron core 45 is adsorbed to the first fixed iron core 42, it is possible to stably keep such a state.

However, if the second movable iron core 46 is configured not to receive the biasing force of the coil spring 47 when the amount of current supplied to the coil 40 is larger than or equal to a predetermined amount, the first movable iron core 45 is not necessarily adsorbed to the first fixed iron core 42. Further, the minimum amount Ia of current required to adsorb the first movable iron core 45 and the minimum amount Ib of current required to keep the adsorption of the first movable iron core 45 can be freely set.

Moreover, in the present embodiment, the solenoid S is used for the solenoid valve 4 disposed partway in the pressure control passage P4, and the solenoid valve 4 includes the valve body 9 that opens and closes the pressure control passage P4. The valve body 9 is biased in the closing direction by the force to attract the second movable iron core 46 due to energization of the coil 40, and the valve opening pressure of the valve body 9 is adjusted by the solenoid S. The pressure on the upstream side of the solenoid valve 4 is controlled by the valve opening pressure of the valve body 9, and the solenoid valve 4 can function as a pressure control valve.

Further, in the present embodiment, the solenoid valve 4 is used for the damper D, and the damper D includes the cylinder 1, the piston 10 that is slidably inserted into the cylinder 1 and partitions the inside of the cylinder 1 into the extension-side chamber L1 and the compression-side chamber L2, the main passage P1 that causes the extension-side chamber L1 to communicate with the compression-side chamber L2, the annular valve seat member 2 through which the main passage P1 passes on its inner circumferential side, the main valve body 3 that is seated on and separated from the valve seat member 2 to apply a resistance to a flow of a liquid passing through the main passage P1, the extension-side pressure introduction passage P2 that includes the orifice O1 partway to reduce the pressure of the extension-side chamber L1 and guide the reduced pressure to the back surface of the main valve body 3, the compression-side pressure introduction passage P3 that reduces the pressure of the compression-side chamber L2 and guides the reduced pressure to the back surface of the main valve body 3, and the pressure control passage P4 that is connected downstream of the orifice O1 in the extension-side pressure introduction passage P2, and the solenoid valve 4 is disposed partway in the pressure control passage P4.

The main valve body 3 include the first valve body member 30 that has an annular shape and is seated on and separated from the valve seat member 2 and the second valve body member 31 that is stacked on the first valve body member 30 (side opposite to valve seat member), and is seated on and separated from the first valve body member 30. The first valve body member 30 and the second valve body member 31 are biased in the direction away from the valve seat member 2 by the pressure of the extension-side chamber L1. On the other hand, the second valve body member 31 is biased in the direction away from the first valve body member 30 by the pressure on the inner circumferential side of the first valve body member 30. Further, the first valve body member 30 and the second valve body member 31 are biased toward the valve seat member 2 by the force to attract the second movable iron core 46 due to the energization of the coil 40.

According to the above configuration, when the biasing force of the coil spring 47 is canceled by the attraction of the first movable iron core 45 in the normal state, the thrust applied to the valve body 9 and the main valve body 3 in the closing direction increases as the amount of current supplied to the solenoid S is increased, so that hard damping force characteristics are achieved. In other words, when soft damping force characteristic are achieved, only a small amount of current supplied to the solenoid S is required. When the damper D is mounted on a vehicle, the power consumption during normal traveling can be reduced. Moreover, heat generation of the solenoid S can be reduced and a change in the liquid temperature of the damper D can be made small, so that the change in damping force characteristics due to the change in the liquid temperature can be made small.

Furthermore, according to the above configuration, the attraction of the first movable iron core 45 is released at the time of a failure, and the coil spring (biasing member) 47 can bias the valve body 9, the first valve body member 30, and the second valve body member 31 so as to close these members. Consequently, the valve opening pressure of the valve body 9 at the time of a failure can be determined by the setting of the coil spring 47, and the first valve body member 30 or the second valve body member 31 can apply a predetermined resistance to a flow of a liquid passing through the main passage P1.

As described above, the biasing force of the coil spring 47 is canceled in the normal state, the damper D can apply a larger damping force than that in the full soft state at the time of a failure, and thus it is possible to prevent the damping force from becoming insufficient at the time of a failure. In addition, according to the above configuration, the liquid can pass through the pressure control passage P4 even at the time of a failure, and thus it is not necessary to provide a passage for allowing the flow of the liquid at the time of a failure in addition to the passage for pressure control. Therefore, the configuration of the damper D can be simplified and the cost can be reduced.

However, the configuration of the passage in which the solenoid valve 4 including the solenoid S is provided can be changed as appropriate, and the configuration of the damper D including the solenoid valve 4 can also be changed as appropriate. For example, when the damper includes a reservoir as described above, the main passage having the main valve body 3 whose back pressure is controlled by the solenoid valve 4 may cause the extension-side chamber or the compression-side chamber to communicate with the reservoir, or the extension-side valve 5 and the compression-side valve 6 may be eliminated. In addition, it is needless to mention that the solenoid valve 4 may be used in various devices other than the damper D, and the solenoid S may also be used in various devices other than the solenoid valve 4 functioning as a pressure control valve.

Such changes can be made regardless of the arrangement of a fixed iron core in order to attract the first movable iron core 45 and the second movable iron core 46 in the direction away from each other, the configurations of the first movable iron core 45 and the second movable iron core 46, the configuration of the biasing member, and the configuration of the regulation member.

Although the preferred embodiment of the present invention has been described above in detail, modifications, variations and changes are possible without departing from the scope of the claims.

The invention claimed is:

1. A solenoid, comprising:
a coil;
a first movable iron core and a second movable iron core that are attracted in a direction away from each other by energizing the coil;
a first fixed iron core and a second fixed iron core that are arranged with a predetermined distance between the first fixed iron core and the second fixed iron core;
a biasing member that biases the first movable iron core toward the second movable iron core; and
a first regulation member that restricts approach of the first movable iron core and the second movable iron core, wherein
the first movable iron core and the second movable iron core are disposed between the first fixed iron core and the second fixed iron core so as to be able to approach and be separated from the first fixed iron core and the second fixed iron core, respectively,
both the first movable iron core and the second movable iron core have a cylindrical shape with a bottom, and bottom portions of the first movable iron core and the second movable iron core face the second fixed iron core,
the first movable iron core is movably inserted into an inside of the second movable iron core,
the biasing member is inserted into an inside of the first movable iron core to be interposed between the bottom portion of the first movable iron core and the first fixed iron core,
the first movable iron core is disposed on a side of the second movable iron core facing the first fixed iron core to be attracted to the first fixed iron core by energizing the coil, and
the second movable iron core is disposed on a side of the first movable iron core facing the second fixed iron core to be attracted to the second fixed iron core by energizing the coil.

2. The solenoid according to claim 1, wherein
the first movable iron core is set to be adsorbed to the first fixed iron core by energizing the coil, and
a minimum amount of current required to adsorb the first movable iron core to the first fixed iron core is larger than a minimum amount of current required to keep the first movable iron core adsorbed to the first fixed iron core.

3. The solenoid according to claim 1, further comprising a second regulation member that restricts approach of the second movable iron core and the second fixed iron core.

4. A solenoid valve that includes the solenoid according to claim 1 and is provided partway in a pressure control passage, the solenoid valve comprising:
a valve body that opens and closes the pressure control passage; and
the solenoid that adjusts a valve opening pressure of the valve body, wherein
the valve body is biased so as to be closed by a force to attract the second movable iron core due to energization of the coil.

5. A damper comprising:

a cylinder;

a piston that is slidably inserted into the cylinder and partitions an inside of the cylinder into an extension-side chamber and a compression-side chamber;

a main passage that causes the extension-side chamber to communicate with the compression-side chamber;

a valve seat member that has an annular shape and through which the main passage passes on an inner circumferential side of the valve seat member;

a main valve body that is seated on and separated from the valve seat member to apply a resistance to a flow of a liquid passing through the main passage;

an extension-side pressure introduction passage that includes an orifice partway in the extension-side pressure introduction passage to reduce a pressure of the extension-side chamber and guide a reduced pressure to a back surface of the main valve body;

a compression-side pressure introduction passage that reduces a pressure of the compression-side chamber and guides a reduced pressure to the back surface of the main valve body;

a pressure control passage that is connected downstream of the orifice in the extension-side pressure introduction passage; and a solenoid valve that is disposed partway in the pressure control passage, wherein the main valve body includes
- a first valve body member that has an annular shape, and is seated on and separated from the valve seat member, and
- a second valve body member that is stacked on a side of the first valve body member opposite to the valve seat member, and is seated on and separated from the first valve body member, the first valve body member and the second valve body member are biased in a direction away from the valve seat member by the pressure of the extension-side chamber, the second valve body member is biased in a direction away from the first valve body member by a pressure on an inner circumferential side of the first valve body member, the solenoid valve includes
- a valve body that opens and closes the pressure control passage, and
- a solenoid that adjusts a valve opening pressure of the valve body, the solenoid includes
- a coil,
- a first movable iron core and a second movable iron core that are attracted in a direction away from each other by energizing the coil,
- a biasing member that biases the first movable iron core toward the second movable iron core, and
- a first regulation member that restricts approach of the first movable iron core and the second movable iron core, the valve body is biased so as to be closed by a force to attract the second movable iron core due to energization of the coil, and the first valve body member and the second valve body member are biased toward the valve seat member by a force to attract the second movable iron core due to energization of the coil.

* * * * *